United States Patent [19]

Wood

[11] 4,318,495

[45] Mar. 9, 1982

[54] REUSABLE SANITARY DUST CAP FOR A BEVERAGE TANK VALVE

[75] Inventor: Arthur A. Wood, Greenville, Ohio

[73] Assignee: Replicap Products, Inc., Greenville, Ohio

[21] Appl. No.: 191,678

[22] Filed: Sep. 29, 1980

[51] Int. Cl.³ .............................................. B65D 55/16
[52] U.S. Cl. .................................... 220/375; 220/85 P
[58] Field of Search ...................... 220/85 P, 339, 375; 215/306

[56] References Cited

U.S. PATENT DOCUMENTS 1,937,674 12/1933 Teason ............................ 220/375 X
2,971,045 2/1961 August ............................ 220/339 X Primary Examiner—George T. Hall
Attorney, Agent, or Firm—Jacox & Meckstroth

[57] ABSTRACT

A sanitary dust cap unit is molded of flexible plastics material and includes a cup-shaped cap portion which snap-fits onto a dispensing check valve projecting from a portable metal tank adapted to contain a beverage. The unit also includes an annular retaining loop portion which surrounds the base of the valve and is integrally connected to the cap portion by a thin card-like tag portion having a width greater than the width of the cap portion. The tag portion is printed with information identifying the beverage and/or beverage producer and is flexible to permit the cap portion to be attached to the valve while the retaining portion surrounds the base of the valve.

7 Claims, 2 Drawing Figures

REUSABLE SANITARY DUST CAP FOR A BEVERAGE TANK VALVE

BACKGROUND OF THE INVENTION

In the distribution of various consumable beverage products, such as premix or postmix soft drink beverages which are delivered to restaurants and other eating facilities, each beverage product is commonly enclosed within a portable stainless steel tank adapted to contain approximately five gallons. The tank is usually provided with two check valves which are connected to flexible hoses or lines for pressurizing the tank with carbon dioxide gas and for dispensing the beverage from the tank. Each of the valves usually carries an O-ring seal and preferably is provided with a sanitary protective dust cap which is molded of a plastics material. The dust cap has one or more inwardly projecting and circumferencially extending internal ribs to provide for snap-fitting the dust cap onto the O-ring seal of the dispensing valve.

One form of sanitary dust cap which has been produced for many years by applicant's assignee is a disposable dust cap which is placed on each valve by the beverage producer when the portable tank receives a premeasured volume of a beverage. After the filled tank is delivered to its destination and is ready for use, the dust cap is removed from its valve and is discarded. The valves are then coupled or connected to corresponding flexible hoses or lines which provide for removing or dispensing the beverage product from the tank.

Another form of sanitary protective dust cap which has been manufactured by applicant's assignee is a reusable dust cap wherein the cap is molded of a plastics material and is connected by a narrow flexible link to an integrally molded annular retaining loop portion which snap-fits onto the base portion of the valve and remains attached to the valve. When it is desired to snap-fit the cap onto the valve, the flexible link, connecting the cap to the retainer loop, is bent or flexed. Thus when the cap is removed from the valve after the beverage tank arrives at its destination and is ready to be connected, the cap remains attached to the valve by the connecting link portion and retainer loop. The cap is subsequently sanitized with the tank after the tank is returned to the supplier for another supply of a beverage product.

Usually each molded plastic sanitary dust cap is printed by hot-stamping with a trademark which corresponds to the beverage product contained within the tank, for example, with one of the well known trademarks such as COCA-COLA or PEPSI-COLA or DR PEPPER. The beverage tank is also commonly provided with a separate label and/or tag which identifies the producer of the beverage product, the ingredients used in making the product and the volume of the product within the tank. The labels are preprinted and usually attached to the tank by adhesive, and the tags are commonly die-cut from a sheet of plastics material, and each tag is provided with a die-cut hole which is adapted to receive the dispensing valve for attaching the tag to the tank.

SUMMARY OF THE INVENTION

The present invention is directed to an improved sanitary dust cap unit which is adapted to be mounted on a dispensing valve projecting from a supply tank for a beverage product and which significantly simplifies the labeling or marking of the tank to identify the product, the producer of the product, the ingredients in the product and such other information as is desired in the distribution of the product. Thus the sanitary cap unit of the invention provides for more quickly and efficiently marking a tank to identify its contents or the contained beverage product and the source for the product.

In accordance with the invention, the above features and advantages are provided by molding a dust cap unit of a flexible plastics material and by integrally connecting a sanitary cap portion to a retainer loop portion by a flexible tag portion which is substantially wider than the cap and retainer loop portions. The tag portion is then printed or marked with identifying information for the beverage product within the tank at the same time the cap portion is printed with a trademark or other information relating to the product. The integrally connecting tag portion is sufficiently thin and flexible so that it may be easily curved when it is desired to attach the cap portion of the unit to the dispensing valve.

Other features and advantages of the invention will be apparent from the following description, the accompanying drawing and the appended claims.

DESCRIPTION OF THE PREFERRED EMBODIMENT

Figure 1:
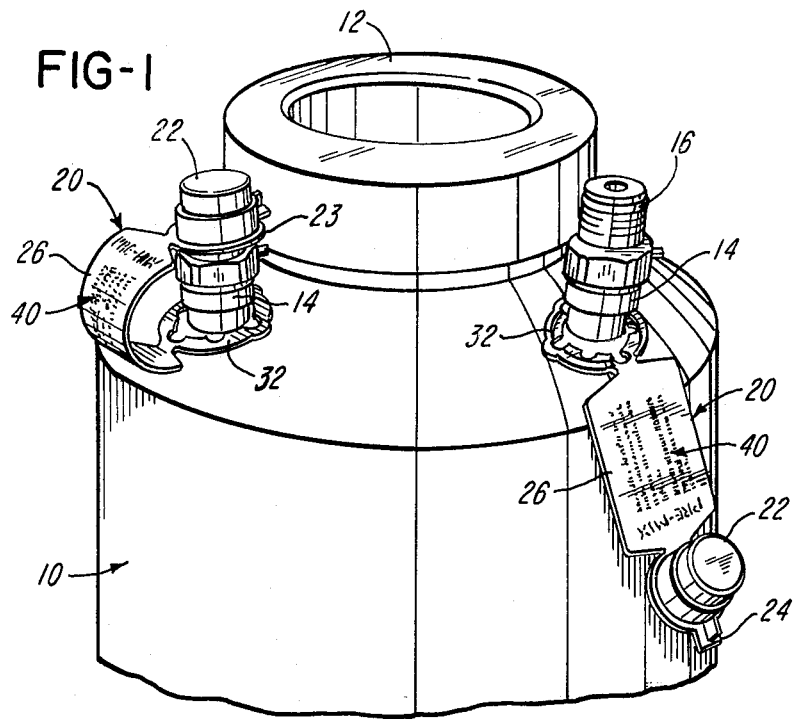
FIG. 1 is a perspective view of the upper portion of a tank for distributing a beverage product and which illustrates the use of two sanitary dust cap units constructed in accordance with the invention.

FIG. 1 shows a stainless steel tank 10 which has a removable lid or closure 12 and is adapted to receive a beverage product that is pressurized with carbon dioxide gas. The product may be in the form of a concentrated syrup or a "premix" which is carbonated by the supplier of the product, or the tank may contain a "postmix" product which is subsequently carbonated by a customer who receives the tank and beverage product. Usually, a pair of check-type dispensing valves 14 project upwardly from the top wall of the tank, and the valves are adapted to be coupled to corresponding flexible lines or hoses which provide for pressurizing the tank with carbon dioxide gas and for dispensing the beverage product from the tank to a manually controllable dispensing valve connected to the opposite end of one of the hoses. Each of the valves 14 is provided with a resilient O-ring 16 which forms a fluid-tight seal between the valve 14 and the hose fitting which is coupled to the valve.

In accordance with the present invention, each of the valves 14 and O-ring seals 16 are protected by a sanitary dust cap unit 20 which is molded of a plastics material such as polyethylene. The cap unit 20 includes a cup-shaped cap portion 22 which has an outwardly projecting bottom flange 23 and a finger tab 24. The hollow cap portion 22 has a set of axially spaced and inwardly projecting circumferentially extending ribs (not shown), and the cap portion is adapted to receive either of the two forms of valves 14 which are commonly used on the metal beverage tanks. When the cap portion 22 is pressed onto a valve 14, one of the internal ribs snaps over the O-ring seal 16 to form a positive snap-fit of the cap portion on the valve.

The cap unit 20 also includes an integrally molded card-like flexible tag portion 26 which connects with the cap portion 22 by a narrow neck portion 27. The tag portion 26 has a uniform thickness of approximately 0.040 inch and a width which is substantially greater than the width of the cap portion 22. The length of the tag portion 26 is greater than the width of the tag portion to provide a generally rectangular configuration, and opposite ends of the tag portion are formed by tapered or converging end surfaces 29.

Figure 2:
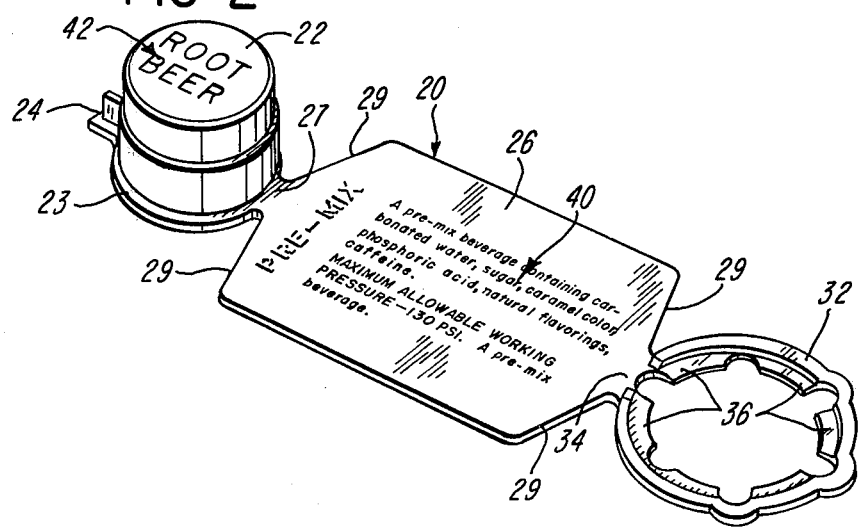
FIG. 2 is an enlarged perspective view of a sanitary cap unit constructed in accordance with the invention and as illustrated in use in FIG. 1.

As also shown in FIG. 2, the cap unit 20 includes an annular or ring-like retaining loop portion 32 which is integrally connected to the tag portion 26 by a narrow neck portion 34. The retaining loop portion 32 has circumferentially spaced and inwardly projecting tabs 36 which are adapted to flex in a spring-like manner when the loop portion 32 is pressed downwardly onto a valve 14. The retaining portion 32 is thereby attached to the valve 14 so that after the cap portion 22 is removed from a valve 14, the cap 20 will not fall off the valve in the event the beverage tank 10 is inverted while the tank is being delivered from a customer back to the supplier of the beverage product. As apparent from FIG. 1, the tag portion 26 of the cap unit 20 is sufficiently thin and flexible to provide for attaching the cap portion 22 to the valve 14 while the retaining loop portion 32 is attached to the base portion of the valve.

The tag portion 26 of the cap unit 20 is preprinted, for example by hot-stamping, with information 40 which identifies the contents of the beverage product within the tank 10 and/or the producer of the product, and/or the volume of the product within the tank. This information 40 is printed on the tag portion 26 at the same time as the trademark 42 for the product is printed on the top wall of the cap portion 22. If desired, the opposite side or surface of the tag portion 26 may also be printed with additional information corresponding to the beverage product within the tank. It is also within the scope of the invention to print or hot-stamp the tag portion 26 with a calender and to provide for punching one or more holes within the tag portion with a hand operated punch and at locations corresponding to the date when the beverage product was placed within the container 10.

From the drawing and the above description, it is apparent that a sanitary cap unit constructed in accordance with the invention, provides desirable features and advantages. For example, the incorporation of the tag portion 26 as an integral connector between the cap portion 22 and the retaining portion 32, simplifies the operation required for preparing a supply tank for delivery to a customer. That is, a single cap unit 20 not only protects a dispensing valve 14 but also identifies the contents of the beverage product within the tank 10 in addition to the source of the product. Thus, the cap unit 20 eliminates the need for producing or die cutting separate identification tags as well as the need for separately handling and printing the tags and assembling the tags onto the tank valves. As mentioned above, the tag portion 26 may also be printed at the same time as the cap portion 22 is printed so that a separate printing operation for the tag portion 26 is not required. As a result, the cap unit 20 provides for greater efficiency in distributing a beverage product within a portable container or tank by eliminating the requirement for producing and using separate identification tags on the tank.

While the form of sanitary dust cap unit herein described constitutes a preferred embodiment of the invention, it is to be understood that the invention is not limited to this precise form of cap unit, and that changes may be made therein without departing from the scope and spirit of the invention as defined in the appended claims.

The invention having thus been described, the following is claimed:

1. In a reusable sanitary cap unit adapted for protecting a dispensing valve projecting from a portable tank containing a consumable beverage product, said cap unit including a cup-shaped cap portion having means for attaching to the dispensing valve in covering relation, a ring-like retaining portion adapted to extend around the base of the dispensing valve, and said cap portion and said retaining portion being molded of a flexible plastics material, the improvement wherein said cap portion and said retaining portion are integrally connected by an integrally molded card-like tag portion, said tag portion having a width greater than the width of said cap portion and being flexible to provide for bending said tag portion to attach said cap portion to the dispensing valve while said retaining portion is attached to the valve, and said tag portion being provided with information identifying the beverage product within the tank.

2. A sanitary cap unit as defined in claim 1 wherein said tag portion is integrally connected to both of said cap portion and said retaining portion by narrow neck portions having a width less than the width of said cap portion.

3. A sanitary cap unit as defined in claim 1 wherein said tag portion is generally rectangular in configuration and has converging opposite end surfaces.

4. A sanitary cap unit as defined in claim 3 wherein said cap portion, said tag portion and said retaining portion have a substantially uniform wall thickness.

5. A sanitary cap unit as defined in claim 1 wherein tag portion is printed on one side to provide said identifying information.

6. A sanitary cap unit as defined in claim 5 wherein said cap portion has a top surface which faces in the same direction as said one side of said tag portion, and said top surface is also printed with identifying information for the beverage product.

7. In a reusable sanitary cap unit adapted for protecting a dispensing valve projecting from a portable tank containing a consumable beverage product, said cap unit including a cup-shaped cap portion having means for attaching to the dispensing valve in covering relation, a ring-like retaining portion adapted to extend around the base of the dispensing valve, and said cap portion and said retaining portion being molded of a flexible plastics material, the improvement wherein said cap portion valve, and said cap portion and said retaining portion being molded of a flexible plastics material, the improvement wherein said cap portion and said retaining portion are integrally connected by an integrally molded card-like tag portion, said tag portion having a width substantially greater than the width of said cap portion and being flexible to provide for bending said tag portion to attach said cap portion to the dispensing valve while said retaining portion is attached to the valve, said cap portion projecting upwardly from a plane defined by one side of said tag portion, and said one side of said tag portion being printed with information identifying the beverage product within the tank.

* * * * *

UNITED STATES PATENT AND TRADEMARK OFFICE
CERTIFICATE OF CORRECTION

PATENT NO. : 4,318,495
DATED : March 9, 1982
INVENTOR(S) : Arthur A. Wood

It is certified that error appears in the above-identified patent and that said Letters Patent are hereby corrected as shown below:

Column 4, Claim 7, line 55, cancel "valve and said cap portion".

Column 4, Claim 7, lines 56, 57 and 58, cancel "being molded of a flexible plastics material, the improvement wherein said cap portion and said retaining portion".

Signed and Sealed this

Eleventh Day of May 1982

[SEAL]

Attest:

GERALD J. MOSSINGHOFF

*Attesting Officer*  *Commissioner of Patents and Trademarks*